(12) United States Patent
Kottapalli

(10) Patent No.: US 11,570,241 B2
(45) Date of Patent: Jan. 31, 2023

(54) TEAMING APPLICATIONS EXECUTING ON MACHINES OPERATING ON A COMPUTER WITH DIFFERENT INTERFACES OF THE COMPUTER

(71) Applicant: VMware, Inc., Palo Alto, CA (US)

(72) Inventor: Ravi Kumar Reddy Kottapalli, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/384,803

(22) Filed: Jul. 26, 2021

(65) Prior Publication Data

US 2022/0400151 A1    Dec. 15, 2022

(30) Foreign Application Priority Data

Jun. 9, 2021    (IN) .............................. 202141025707

(51) Int. Cl.
*H04L 12/707* (2013.01)
*H04L 67/1023* (2022.01)
(Continued)

(52) U.S. Cl.
CPC ...... *H04L 67/1023* (2013.01); *H04L 41/0668* (2013.01); *H04L 47/2475* (2013.01); *H04L 67/1034* (2013.01); *H04L 67/75* (2022.05)

(58) Field of Classification Search
CPC ............. H04L 67/1023; H04L 41/0668; H04L 47/2475; H04L 67/1034; H04L 67/75
(Continued)

(56) References Cited

U.S. PATENT DOCUMENTS 7,934,020 B1    4/2011   Xu et al.
10,826,785 B2   11/2020  Amit et al.
(Continued)

OTHER PUBLICATIONS

Non-Published Commonly Owned Related U.S. Appl. No. 17/384,800 with similar specification, filed Jul. 26, 2021,43 pages, VMware, Inc.
(Continued)

*Primary Examiner* — Schquita D Goodwin
(74) *Attorney, Agent, or Firm* — Adeli LLP

(57) ABSTRACT

Some embodiments provide a method for associating data message flows from applications executing on a host computer with network interfaces of the computer. The method of some embodiments identifies a set of applications operating on a machine executing on the host computer, identifies candidate teaming policies for associating each identified application with a subset of one or more interfaces, and generates a report to display the identified candidate teaming policies per application to a user. In response to user input selecting a first teaming policy for a first application, the method generates a rule, and distributes the rule, to the host computer to associate the first application with a first subset of the network interfaces specified by the first teaming policy. Similarly, in response to user input selecting a second teaming policy for a second application executing on the machine, the method generates a second rule, and distributes the second rule, to the host computer to associate the second application with a second subset of the network interfaces specified by the second teaming policy.

18 Claims, 16 Drawing Sheets

(51) Int. Cl.
*H04L 47/2475* (2022.01)
*H04L 41/0668* (2022.01)
*H04L 67/1034* (2022.01)
*H04L 67/75* (2022.01)

(58) Field of Classification Search
USPC ........................................................ 709/206
See application file for complete search history.

(56) References Cited

U.S. PATENT DOCUMENTS

| | | |
|---|---|---|
| 2016/0094461 A1 | 3/2016 | Shetty et al. |
| 2018/0181423 A1* | 6/2018 | Gunda ................ G06F 9/45558 |
| 2018/0262594 A1* | 9/2018 | Nhu ........................ H04L 47/32 |
| 2018/0359215 A1 | 12/2018 | Khare et al. |
| 2019/0230025 A1 | 7/2019 | Kommula et al. |
| 2019/0245777 A1 | 8/2019 | Koshy et al. |
| 2020/0014581 A1 | 1/2020 | Aaron et al. |
| 2020/0186460 A1* | 6/2020 | Power ..................... H04L 45/22 |
| 2020/0404076 A1 | 12/2020 | Mahadevan |
| 2021/0243078 A1 | 8/2021 | Sethuramalingam et al. |
| 2021/0281480 A1* | 9/2021 | Gonzalez Prieto ..... H04L 41/28 |
| 2021/0328858 A1* | 10/2021 | Asveren ............... H04L 41/0668 |
| 2022/0070052 A1* | 3/2022 | Chari .................... H04L 47/726 |

OTHER PUBLICATIONS

Non-Published Commonly Owned Related U.S. Appl. No. 17/384,801 with similar specification, filed Jul. 26, 2021, 43 pages, VMware, Inc.

Non-Published Commonly Owned Related U.S. Appl. No. 17/384,802 with similar specification, filed Jul. 26, 2021, 43 pages, VMware, Inc.

* cited by examiner

TEAMING APPLICATIONS EXECUTING ON MACHINES OPERATING ON A COMPUTER WITH DIFFERENT INTERFACES OF THE COMPUTER

BACKGROUND

Port uplink profiles allow users to consistently configure identical capabilities for network adapters across multiple hosts. Today, all the application running on a single virtual machine share common teaming policy irrespective of whether the applications include a mix of high and low priority applications. For high priority traffic, users would often like load-balancing teaming policy, while for other applications, they may prefer other teaming policies, such as failover policies. But this kind of flexibility does not exist today, when high and low priority applications execute on one machine as the teaming policies are defined at a machine level, and not an application level.

Also, datacenter tools today provide a de-centralized way of managing teaming policies. At the present, an administrator can configure and apply a teaming policy at a host level, or a logical switch level, with the logical switch being implemented by multiple software switches executing on multiple host computers. Under this approach, when a customer wants to modify the teaming policy, then he has to identify or keep track of the teaming policies for each logical switch level on each host computer, and then apply this change. In high volume datacenters this is inefficient and not a scalable approach.

SUMMARY

Some embodiments provide a method for associating data message flows from applications executing on a host computer with network interfaces of the computer. The method of some embodiments identifies a set of applications operating on a machine executing on the host computer (e.g., identifies the set of applications after the machine has been deployed on the host computer and the set of applications have been installed on the machine). It then identifies candidate teaming policies for associating each identified application with a subset of one or more interfaces (e.g., uses identities of each application in the set of applications to retrieve a set of candidate teaming policies for the application from a data storage), and generates a report to display the identified candidate teaming policies per application to a user.

In response to user input selecting a first teaming policy for a first application, the method generates a rule, and distributes the rule, to the host computer to associate the first application with a first subset of the network interfaces specified by the first teaming policy. Similarly, in response to user input selecting a second teaming policy for a second application executing on the machine, the method generates a second rule, and distributes the second rule, to the host computer to associate the second application with a second subset of the network interfaces specified by the second teaming policy. A software forwarding element (e.g., software switch or software router) on the host computer processes the first and second rules on the computer to direct first and second data message flows from the first and second applications respectively to the first and second subsets of the network interfaces.

In some embodiments, the set of network interfaces that the method associates with the particular application is a set of virtual interfaces of the software forwarding element. Each virtual interface in the set virtual interfaces in some of these embodiments is associated with a physical port of a set of network interface cards (NICs) of the host computer, with each virtual interface associated with a physical port through a teaming policy. In other embodiments, the set of network interfaces that the method associates with the particular application is the physical port of the host computer's NIC.

The method in some embodiments generates and distributes the rules by providing the user input to a set of one or more controllers that generate the rules and distribute the rules to the host computer. The set of controllers in some embodiments is a cluster of one or more central controllers operating outside of the host computer, and at least one local controller operating on the host computer. The controller cluster generates and distributes the rules to the local controller, which then modifies the rules for operation on the host computer.

In some embodiments, the first application is one instance of an application that executes on the host computer. Another instance of the application is a second application that executes on a machine on a second host computer. For this other instance, the method distributes the first rule to the second host computer to associate the second application instance with a subset of the network interfaces specified by the first teaming policy on the second host computer. This association causes a software forwarding element on the second host computer to forward the data message flows from the second application to the second subset of the network interfaces.

In some embodiments, examples of candidate teaming policies include a load balancing policy that spreads data message flow across two or more interfaces, and a failover policy that comprises one active interface and one standby interface.

In the datapath of a first application executing on a machine operating on a host computer and associated with a first set of interfaces of the host computer, the method of some embodiments identifies a first data message flow sent by the machine. The method then determines that the first data message flow is from the first application executing on the machine. The method next uses an identifier associated with the first application to identify a first set of interfaces of the host computer through which the first data message flow should be sent. The method then forwards the first data message flow out of the host computer through the identified first set of interfaces.

For a second data message flow sent by the machine executing on the host computer, the method of some embodiments determines that the second data message flow is from a second application executing on the machine, and then uses an identifier associated with the second application to identify a second set of interfaces of the host computer through which the first data message flow should be sent. The method then forwards the second data message flow out of the host computer through the second set of interfaces. At least one of the identified sets of interfaces (for the first or second application) has two or more interfaces in some embodiments. Also, the first and second sets of interfaces identified for the first and second application can be different sets of interfaces when the user associates the two applications with two different sets of interfaces of the host computer.

Also, as mentioned above, each set of interfaces in some embodiments includes one or more virtual interfaces of a software forwarding element executing on the host computer, with each virtual interface being associated with a physical port of an NIC of the host computer. Alternatively, each set of interfaces identified for an application in some embodiments includes a set of physical ports of the NIC.

To identify that each data message flow is from a particular application, one module along the egress path of the data message flow on the host computer uses in some embodiments a flow identifier of the data message flow to retrieve an identifier identifying the application from a context engine executing on the host computer. In some embodiments, the context engine receives the application identifier for the flow from a guest introspection agent executing on the machine. Alternatively, in other embodiments, the egress-path module identifies the application associated with the data message flow by extracting an identifier identifying the application from a header of the data message flow.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for allowing a network administrator to associate different applications executing on the same machine or different machines operating on a host computer to different interfaces of the host computer. This method identifies these applications, identifies candidate teaming policies for associating the applications with the computer's interfaces, presents these candidate teaming policies to the network administrator, and uses the administrator's input to configure the host computer to implement the administrator's selected candidate teaming policies for the different applications. Examples of host computer interfaces for which the method of some embodiments can be used include virtual interfaces of a software forwarding element executing on the computer and/or physical ports of one or more physical NICs (PNICs) of the computer.

Figure 1:
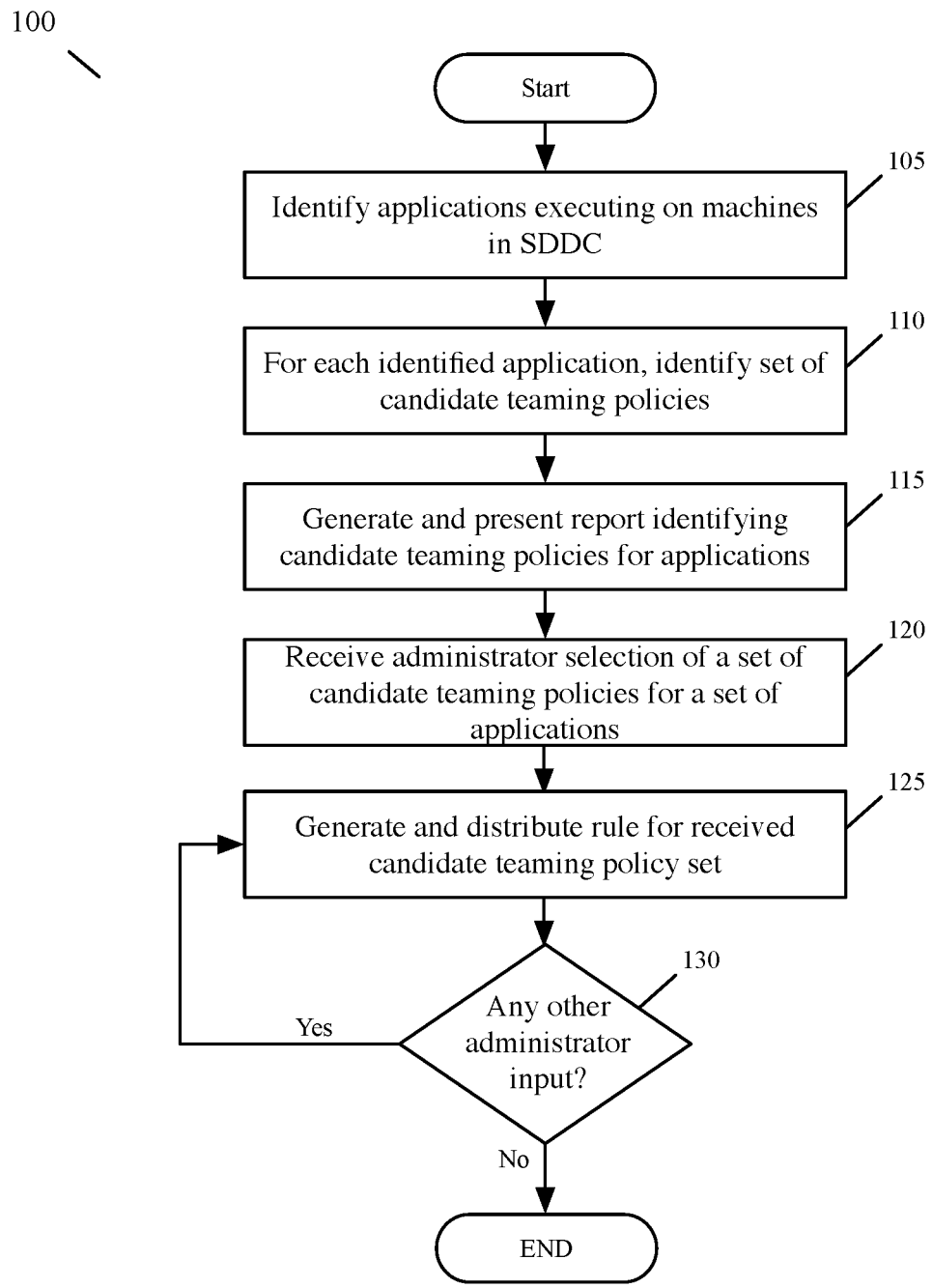
FIG. 1 illustrates a process that implements the method of some embodiments.

FIG. 1 illustrates a process 100 that implements the method of some embodiments. The process 100 associates data message flows from different applications executing on a set of one or more host computers with network interfaces of the set of computers. This figure will be described by reference to FIG. 2, which illustrates a network manager cluster 205 of a software defined datacenter (SDDC) 200 that implements the process 100, along with several other components of the SDDC 200.

In some embodiments, the process 100 is performed each time a network administrator interacts with a network manager cluster 205 of the SDDC 200 (e.g., through a web interface portal) to define one or more teaming policies for one or more applications executing on one or more host computers in the SDDC. As shown, the process 100 of some embodiments identifies (at 105) a set of applications operating on a machine executing on the set of one or more host computers (e.g., identifies the same or different sets of applications installed on these the machine after they have been deployed on the host computers).

Figure 2:
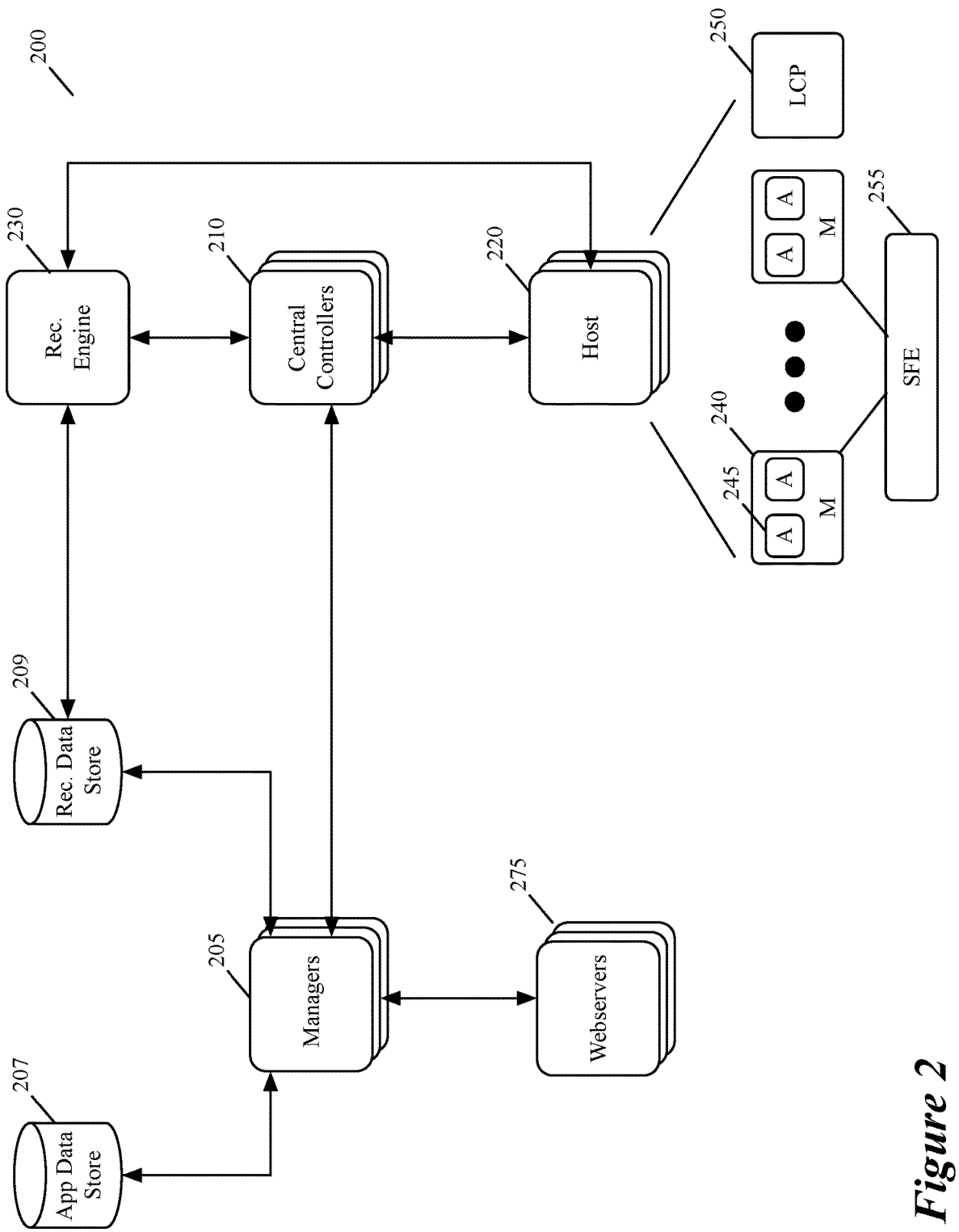
FIG. 2 illustrates a network manager cluster that implement the process of FIG. 1.

FIG. 2 illustrates several host computers 220 each executing several machines 240 on which several applications 245 execute. The host computers also execute software forwarding elements 255 (e.g., software switches) that communicatively connect the machines to each other, and to other machines outside of the host computers through one or more PNICs of the host computers. The software forwarding elements (SFE) use the teaming policies specified through the process 100 to direct the data message flows from applications to SFE virtual interfaces and/or PNIC ports that are associated with the applications through the teaming policies.

In some embodiments, the machines are virtual machines (VMs), Pods or containers. The network manager has the identities of the applications 245 executing on these machines 240 through agents running on the host computers. For instance, in some embodiments, guest introspection agents execute on the VMs on which the applications, Pods or containers operate, and these GI agents identify applications installed on the VMs, Pods, or containers. Examples of such GI agents are described in U.S. Pat. No. 10,802,857, which is incorporated herein by reference.

The application-identity information collected by the GI agents is then provided to the network manager cluster 205. This information is provided either directly from the host computers (e.g., through push mechanisms in which the SDDC host computers 220 publish this information to the manager cluster, or through pull mechanisms in which the manager cluster retrieves this information), or indirectly through a central controller cluster 210 of the SDDC 200 that collects this information (again through push or pull mechanism), and provides this information to the network manager cluster 205.

Once the network manager cluster 205 has the application-identity information, this cluster stores this information in application data store 207. The network manager cluster 205 updates this information iteratively as it receives updates from the hosts or controllers (through push or pull mechanisms). The network manager cluster 205 also uses a teaming-policy recommendation datastore 209, in which it stores different sets of candidate teaming policies for different applications. As further described below by reference to FIG. 13, a teaming-policy recommendation engine 230 of the SDDC specifies the candidate teaming policies stored in the datastore 209, and periodically updates these policies based on what it learns by observing the operation of the applications and/or administrator selection of the teaming policies.

At 110, the network manager cluster 205 identifies candidate teaming policies for associating each application identified at 105 with a subset of one or more interfaces. In some embodiments, the network manager cluster 205 identifies the candidate teaming policies by using each identified application's identifier (that identifies the application in the set of applications identified at 105) to retrieve a set of candidate teaming policies for each application from the recommendation data storage 209.

Next, at 115, the network manager cluster generates a report to display the identified candidate teaming policies per application to a user. Along with candidate teaming policies for one set of applications, the report also displays teaming policies that were previously specified for another set of applications, so that a network administrator can modify these previously specified teaming policies. The generated report is provided to one or more network administrator through a webserver 275 that can provide the report to a user interface of an administrator's computer or device, or respond to API queries from the administrator's computer, device, or automated data collection process.

In some embodiments, examples of candidate teaming policies include a load balancing policy that spreads data message flow across two or more interfaces, and a failover policy that comprises one active interface and one standby interface. More specifically, some embodiments use at least the following three teaming policies (1) a failover order policy specifying an active interface and a standby interface, with a configured interface profile that in case the active interface fails, all the traffic is switched to the standby uplink; (2) a load balancer source policy specifying multiple active interfaces so that load can be distributed across all the active interfaces (e.g., all the active physical NICs); and (3) a load balancer source MAC policy that is similar to load balancer source policy but instead of determining the interface based on the source port, this policy determines the interface based on the source machine's MAC address. The source MAC policy is recommended when using Guest VLAN trunking where multiple MAC addresses are coming from the same port-ID.

Figure 3:
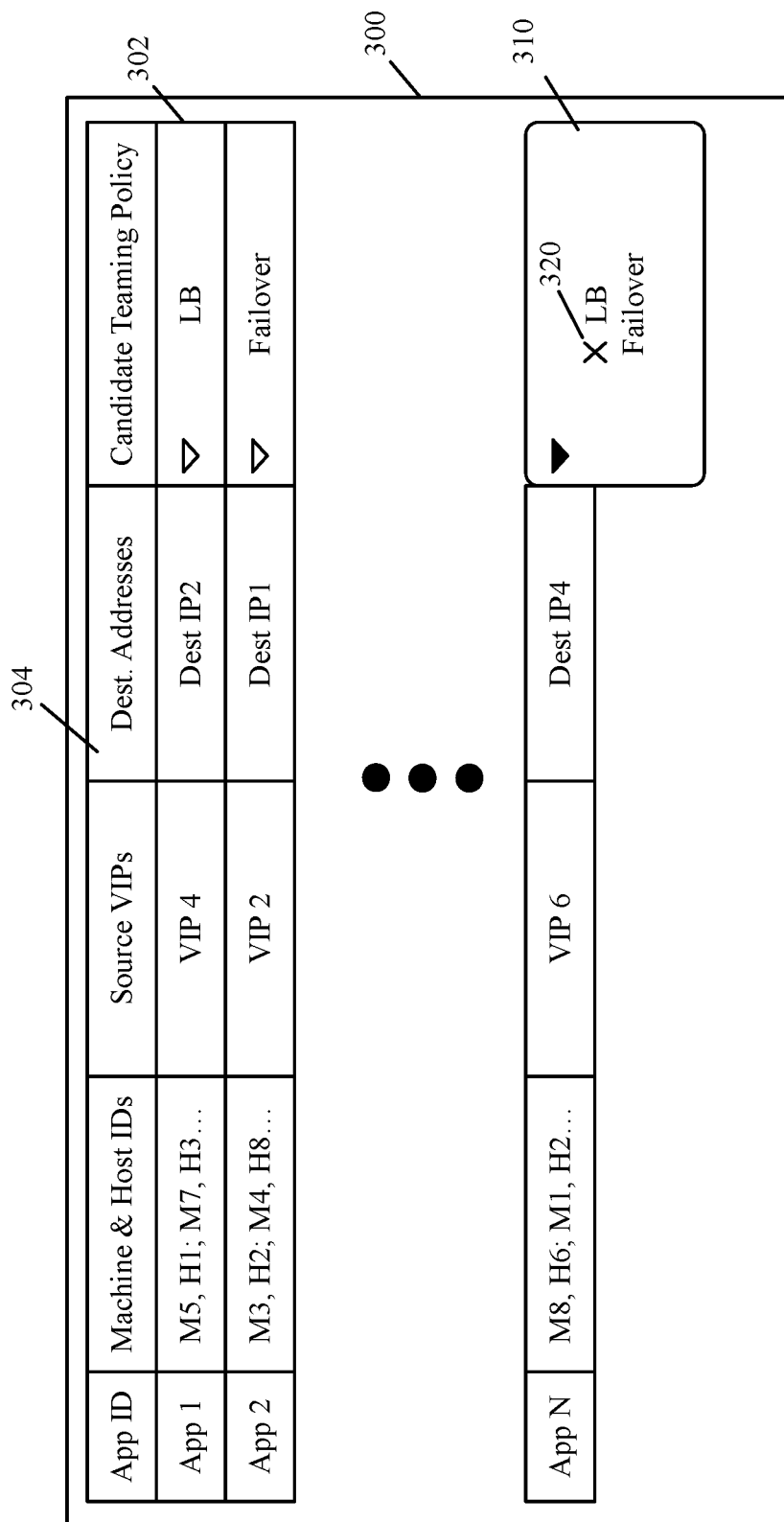
FIG. 3 illustrates an example of a report generated for display through a user interface (UI) of the webserver that the network manager cluster uses to interface with network managers.

FIG. 3 illustrates an example of a report 300 generated (at 115) for display through a user interface (UI) of the web server that the network manager cluster 205 uses to interface with network managers. As shown, this report is a table with multiple rows corresponding to multiple applications, each of which has one or more application instances executing on one or more host computers. In some embodiments, the instances of each application all perform the same set of common operations, and the multiple instances are used to provide these set of common operations on a larger scale to a larger group of client machines.

Examples of applications with multiple application instances include webservers, appservers (application servers), database servers, etc. For such applications, the different instances are different instances of the webservers, appservers or database servers. In some embodiments, each application is associated with a set of one or more virtual network addresses (e.g., virtual IP addresses, VIPs), which are converted to specific network addresses (e.g., destination IP addresses, DIPs) when a particular application instance is selected to process a particular request from a particular client machine.

In FIG. 3, each application is identified along one row 302 of the report 300, with each row containing several columns 304 specifying several different attributes of the application. In this example, these attributes include an application name, one or more VIPs associated with the application, identities of machines on which each instance of the application executes, identities of hosts on which these machines execute, etc. In some embodiments, an application can be associated with multiple rows 302 specifying multiple teaming policies for an application to different destination addresses (e.g., a first row can specify a first teaming policy for application 1 to a destination IP address A, and a second row can specify a second teaming policy for application 1 to a destination IP address B).

These attributes also include a drop-down menu 310, which when selected presents one or more candidate teaming policies that an administrator can select for associating with the application. In FIG. 3, the drop-down menu is open for application X to show two candidate teaming policies for this application, which are the load balancing policy and the failover policy. With the cross mark 320, it also shows the selection of the load balancing policy for this application. The network administrator can select the failover policy instead by simply selecting (e.g., clicking) on the displayed failover policy in the open drop-down menu 310.

In the example of FIG. 3, a network administrator's selection of a teaming policy for an application in some embodiments is applicable to all of the instances of that application that execute on all host computers. As further described below, this selection causes the network administrator to direct the control plane (as implemented by the central controller cluster 210 and the local controllers 250 on the host computers 220) to configure a set of forwarding rules on the set of host computers on which all instances of the application execute to implement the selected teaming policy. Other embodiments, however, provide more granular controls that allow the network administrator to specify different types of teaming policies for different instances of the same application executing on the same or different host computers.

In some embodiments, the set of network interfaces that the process associates with the particular application are a set of virtual interfaces of the software forwarding element. Each virtual interface in the set virtual interfaces in some of these embodiments is associated with a physical port of a set of network interface cards (NICs) of the host computer, with each virtual interface associated with a physical port through a teaming policy. In other embodiments, the set of network interfaces that the process associates with the particular application are the physical port of the host computer's NIC.

Figure 4:
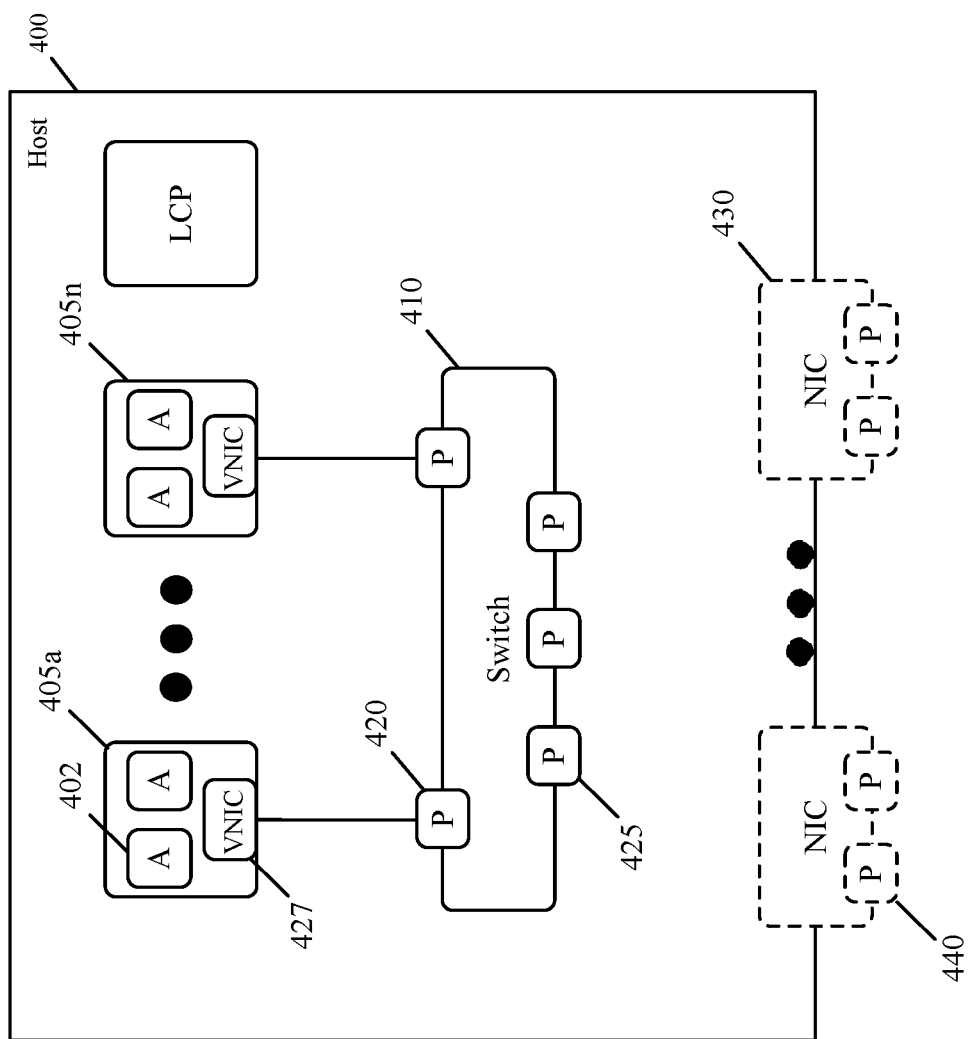
FIG. 4 illustrates examples of interfaces that can be teamed with source applications.

FIG. 4 illustrates examples of such interfaces for some embodiments. Specifically, it illustrates a host computer 400 on which multiple VMs 405 execute, with multiple application instances 402 executing on each VM. One application (i.e., application X) has two instances executing on two machines 405a and 405n. A software switch 410 also executes on the host computer 400, with the software switch having a first set of ports 420 for communicating with the VMs (e.g., for linking with virtual NICs 427 of the VMs) and another set of ports 425 for communicating with the physical NICs 430 of the host computer.

In some embodiments, the virtual interfaces that can be associated with the applications, through the process 100, are the ports 420 that communicate with the physical NICs 430. Alternatively, the interfaces that are associated with the applications, through the process 100 in other embodiments, are the physical ports 440 of the physical NICs 430. In still other embodiments, the process 100 allows the network administrator to associate each application with (1) a subset of one or more ports 420 and (2) a subset of one or more NIC ports 440 that are teamed with the ports 420.

In yet other embodiments, the process 100 allows the network administrator to associate each application with a logical interface (e.g., a logical port) of a logical forwarding element (e.g., logical switch) that is implemented by multiple physical forwarding elements (e.g., multiple virtual/software switches) executing on multiple host computers. In some such embodiments, the teamed logical interface can be defined on just one computer or on multiple computers (e.g., is a downlink/uplink interface defined on multiple computers).

After presenting the report at 115 to the user, the process 100 receives (at 120) the user input selecting a first teaming policy for a first application. In response, the process (at 125) generates a rule, and distributes the rule, to the set of host computers on which all instances of the first application execute to associate the first application with a first subset of the network interfaces specified by the first teaming policy.

Next, at 130, the process 100 determines whether the user provides additional input to associate another application with other teaming policies. If so, the process 100 returns to 125 to generate a second rule, and to distribute the second rule, to a second set of host computers (that can be the same or different than the first set of host computers) on which all instances of the second application execute to associate the second application with a second subset of the network interfaces specified by the second teaming policy specified by the network administrator. The process loops through 125 and 130 until the user has finished specifying teaming policies for applications. The process 100 then ends.

To generate and distribute teaming policy rules at 125, the network manager cluster 205 in some embodiments provides the user input to the cluster of one or more central controllers 210 that generates the rules and distribute the rules to local controllers 250 executing on the host computers 220. The controllers in the central cluster in some embodiments operate outside of the host computer 220, on which the local controller 250 execute.

Figure 5:
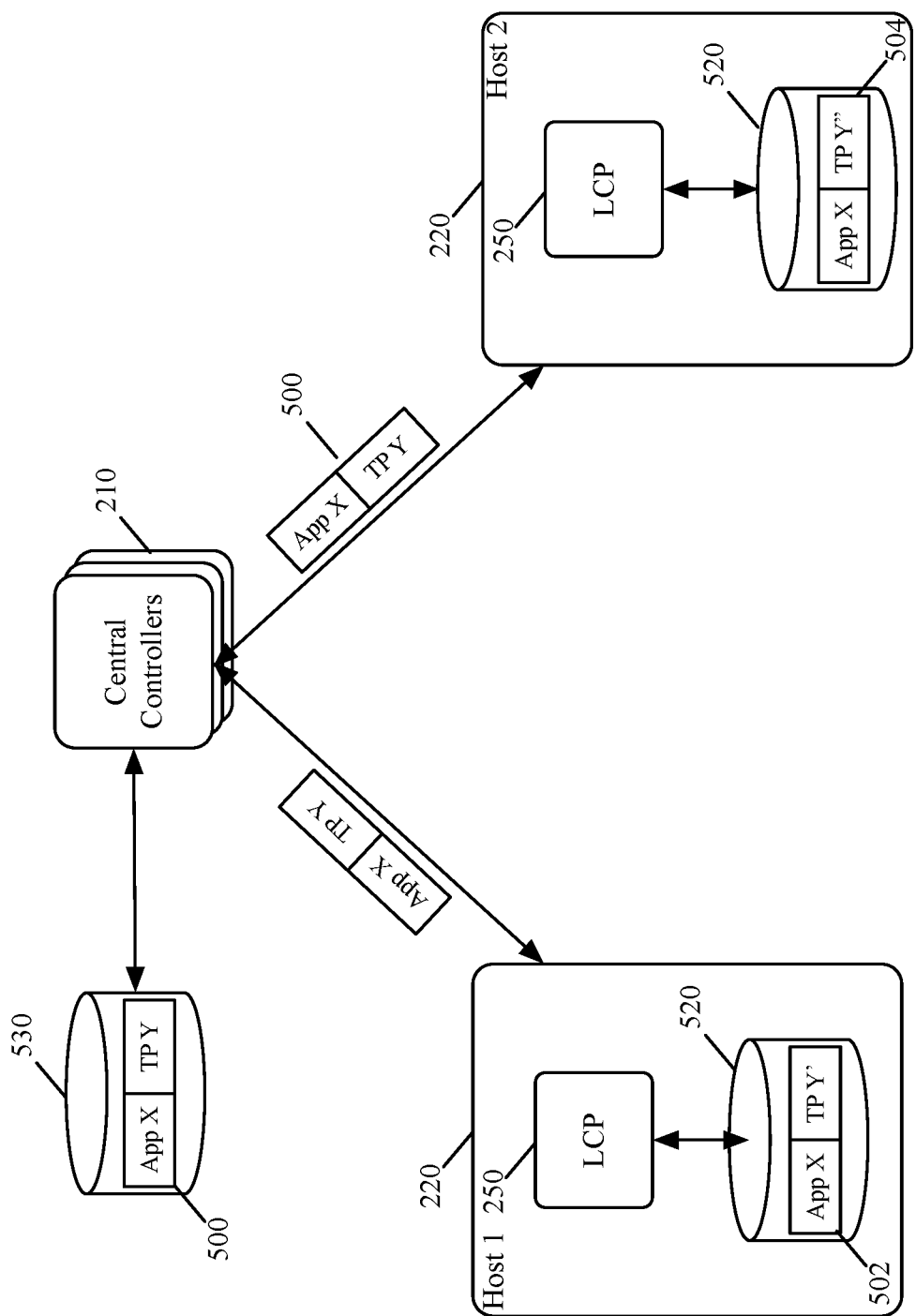
FIG. 5 illustrates one teaming policy record that is distributed by a central controller cluster to two local controllers on two host computers.

The controller cluster generates the same rule for all the application instances of an application and distributes this rule to the local controllers 250, which then modify the rule to match for operation on their respective host computers (e.g., to use the specific interface identifiers of the specific interfaces on their host computers). FIG. 5 illustrates one teaming policy record 500 distributed by the central controller cluster 210 to two local controllers 250 on two host computers 220. The central controller cluster 210 maintains this and other teaming policy records in a policy data store 530.

As shown, each local controller modifies the teaming policy record 500 to use the specific identifiers of the interfaces of their respective host computers, and then stores the teaming policy record in a data store 520 for the software switch of the host computer to use on their respective host computers. This is pictorially illustrated in FIG. 5 by showing the modified teaming policy records 502 and 504 storing modified teaming policies Y' and Y" after receiving the record 500 with the teaming policy Y.

Figure 6:
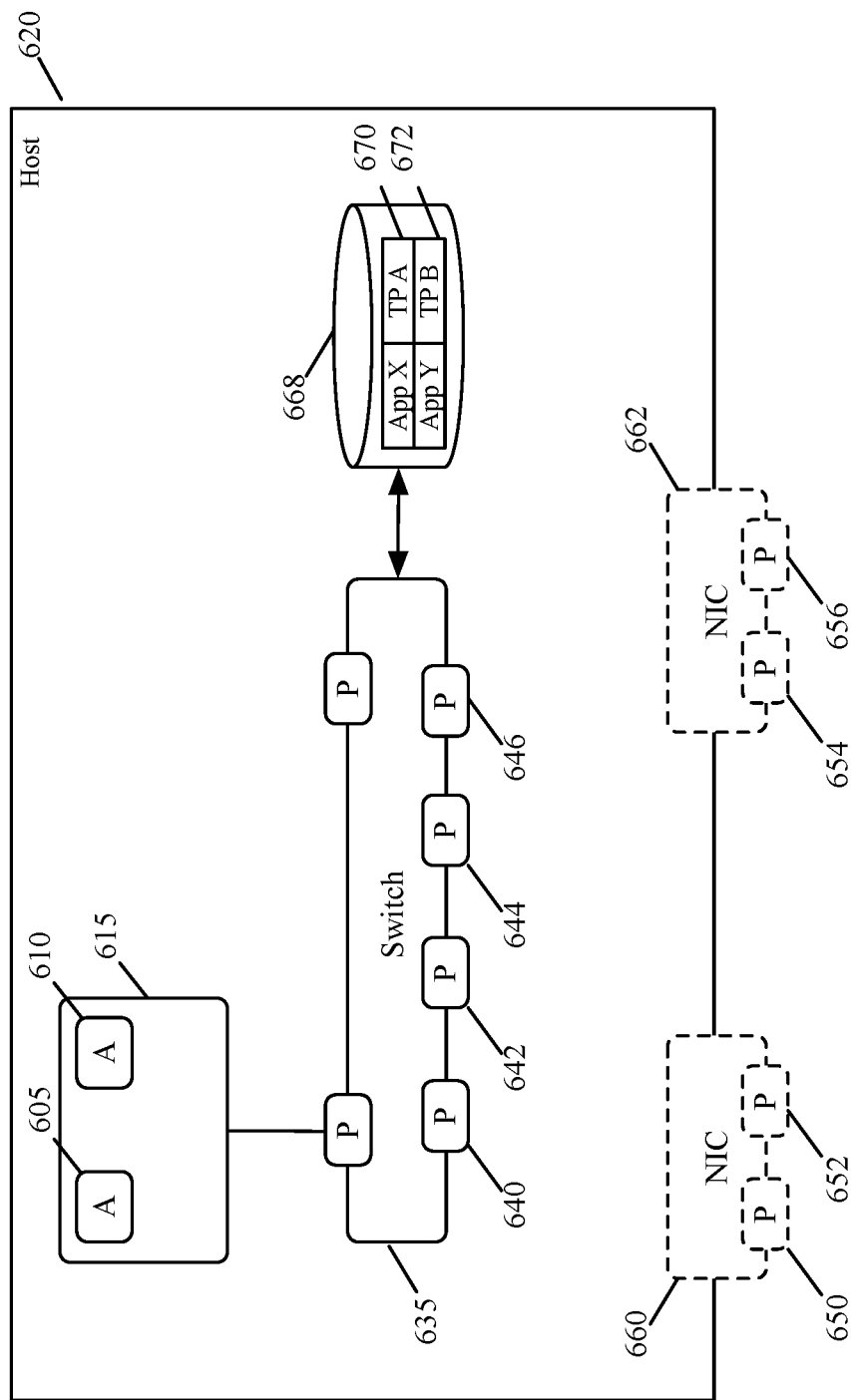
FIGS. 6-10 illustrate examples of software switches that uses teaming policies on host computers to data message flows of the applications through different sets of specified interfaces.

FIGS. 6-10 illustrate examples of software switches that uses teaming policies on host computers to data message flows of the applications through different sets of specified interfaces. FIG. 6 illustrates the use of two teaming policies to forward data message flows from two different applications executing on one machine 615 operating on the host computer 620 to two different sets of interfaces. Specifically, it shows a first application instance 605 of a first application and a second application instance 610 of a second application that execute on the machine 615.

Figure 7:
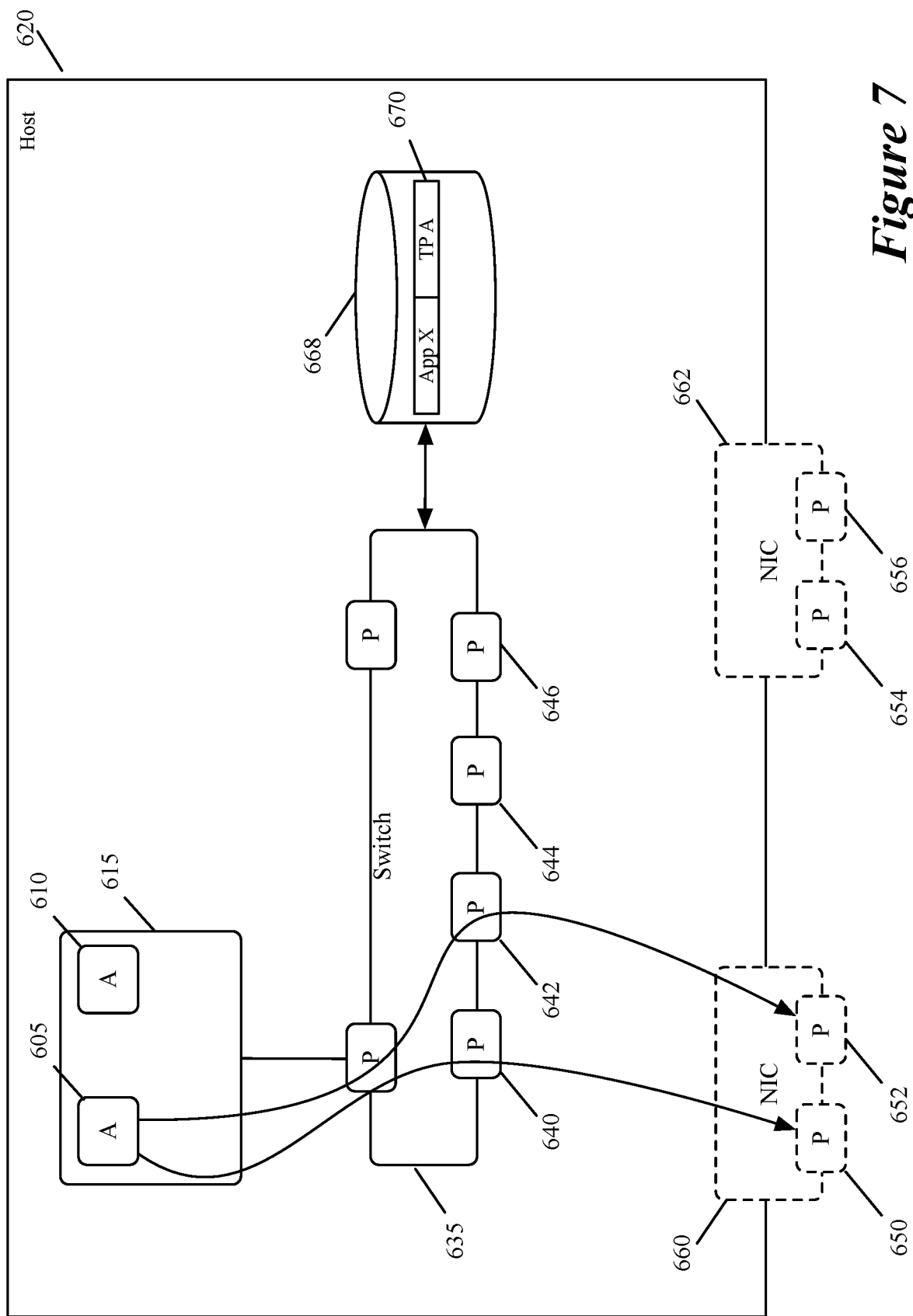

Based on teaming-policy rule 670 in rule storage 668, a software switch 635 executing on the computer 620 distributes, in a load balanced manner, the data message flows of the first application instance 605 to its virtual interfaces 640 and 642, which are paired with ports 650 and 652 of the PNIC 660 of the host computer 620. FIG. 7 shows that the teaming policy rule 670 causes the software switch to distribute different data message flows from the first application instance 605 between the virtual interfaces 640 and 642 (which will go to the PNIC ports 650 and 652) to maximize throughput.

Figure 8:
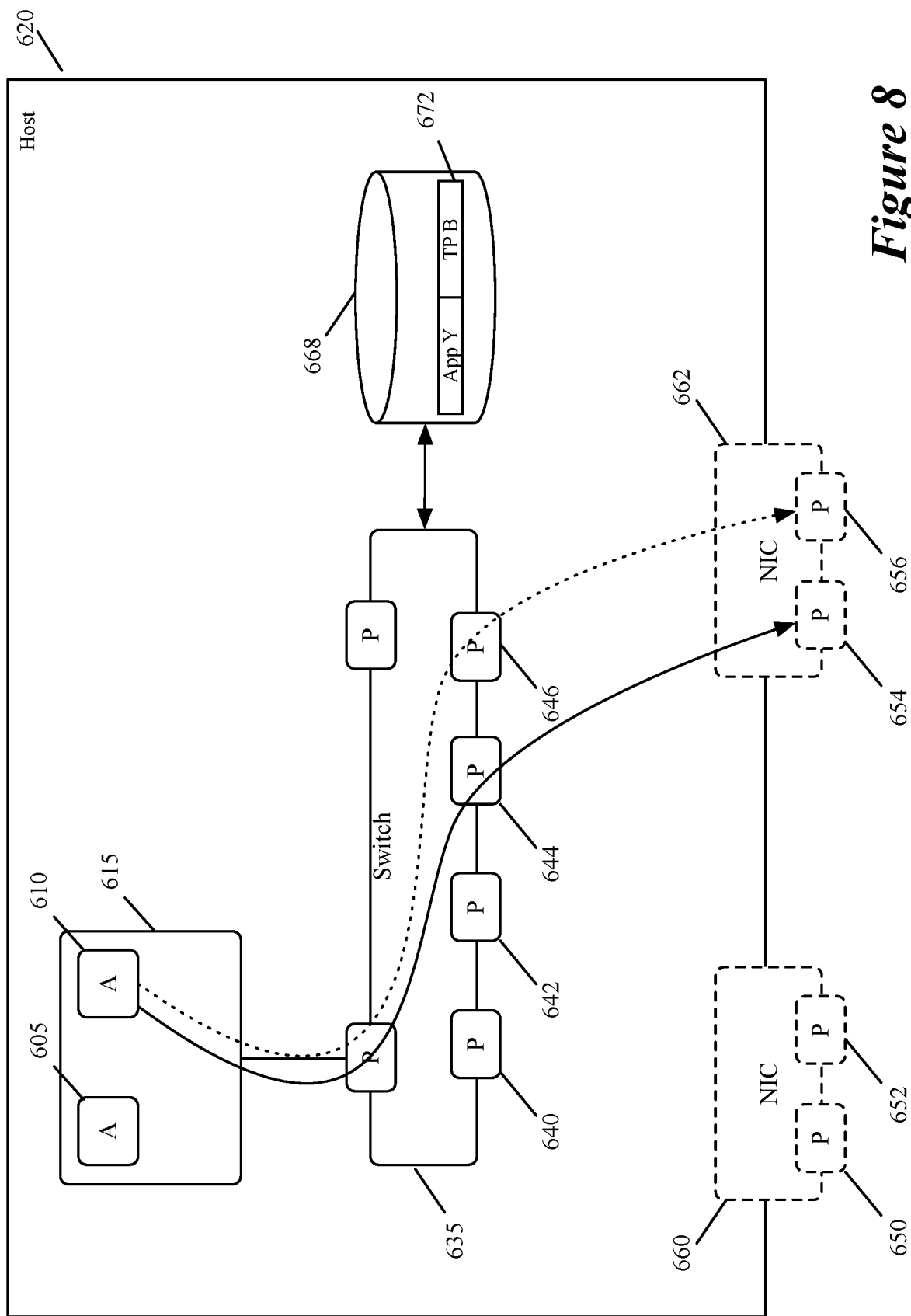

Based on teaming policy rule 670 in rule storage 668, the software switch 635 distributes in a high availability, failover manner the data messages of the second application instance 610 to its virtual interface 644, which is paired with port 654 of the PNIC 662 of the host computer 620. When this virtual interface 644 or the PNIC port 654 fails, the switch distributes the data messages of the second application instance 610 to its virtual interface 646, which is paired with port 656 of the PNIC 662 of the host computer 620. FIG. 8 shows the teaming policy rule 672 directing the software switch 635 to send all the data message flows to the virtual interface 644 (and PNIC port 654) until a failure is detected (of the virtual interface 644 or the PNIC port 654), in which case the software switch sends all subsequent data message flows to the virtual interface 646 (and PNIC port 656).

Figure 9:
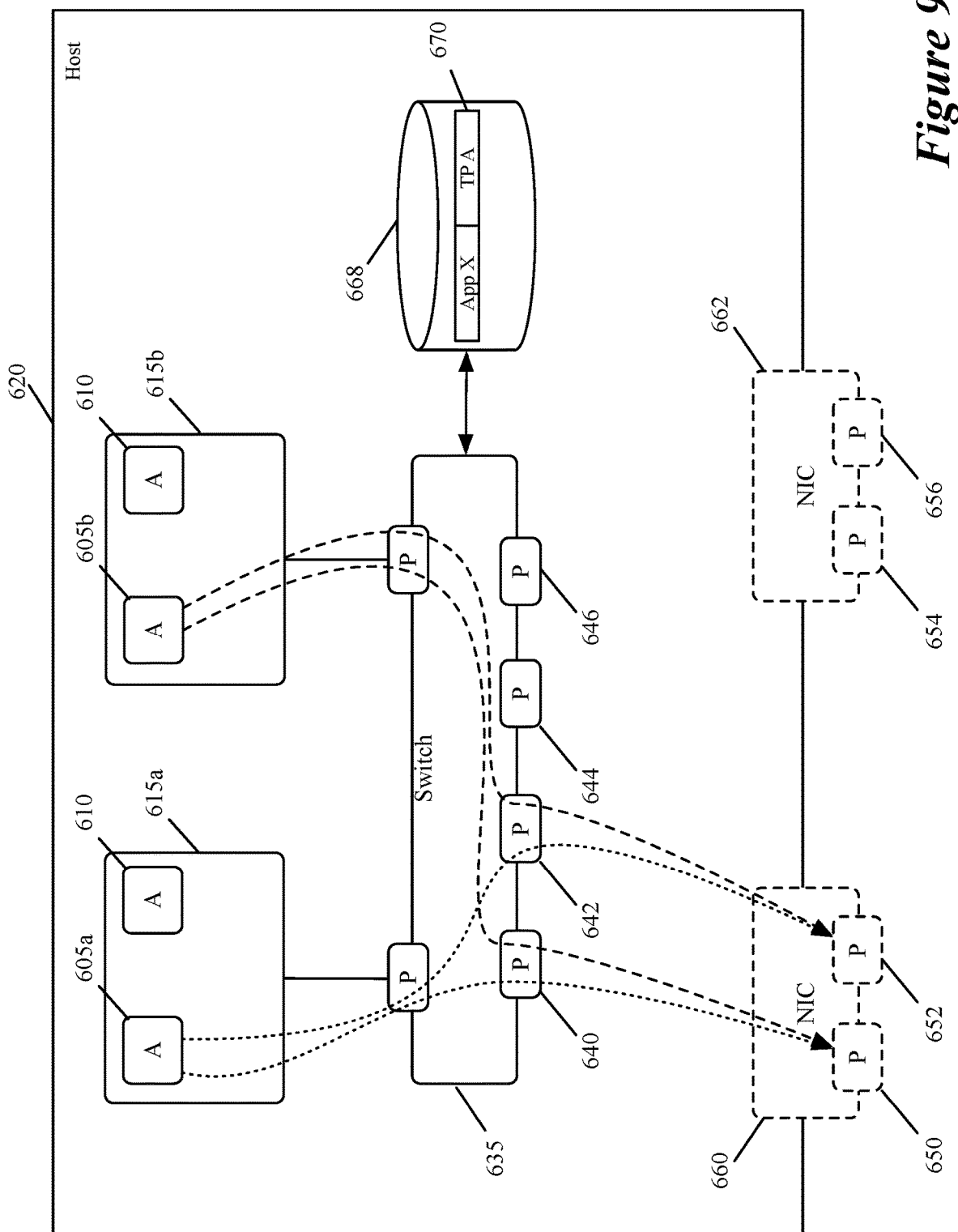

FIG. 9 illustrates one teaming policy rule causing the software switch 635 to similarly distribute data message flows from two different instances of the same application executing on two different machines among a set of interfaces specified by the teaming policy rule. Specifically, this figure illustrates the teaming policy rule 670 causing the software switch to distribute different data message flows from first and second application instances 605*a* and 605*b* of the same application that execute on the machines 615*a* and 615*b*, in a load balanced manner between the virtual interfaces 640 and 642 (which will go to the PNIC ports 650 and 652) to maximize throughput.

Figure 10:
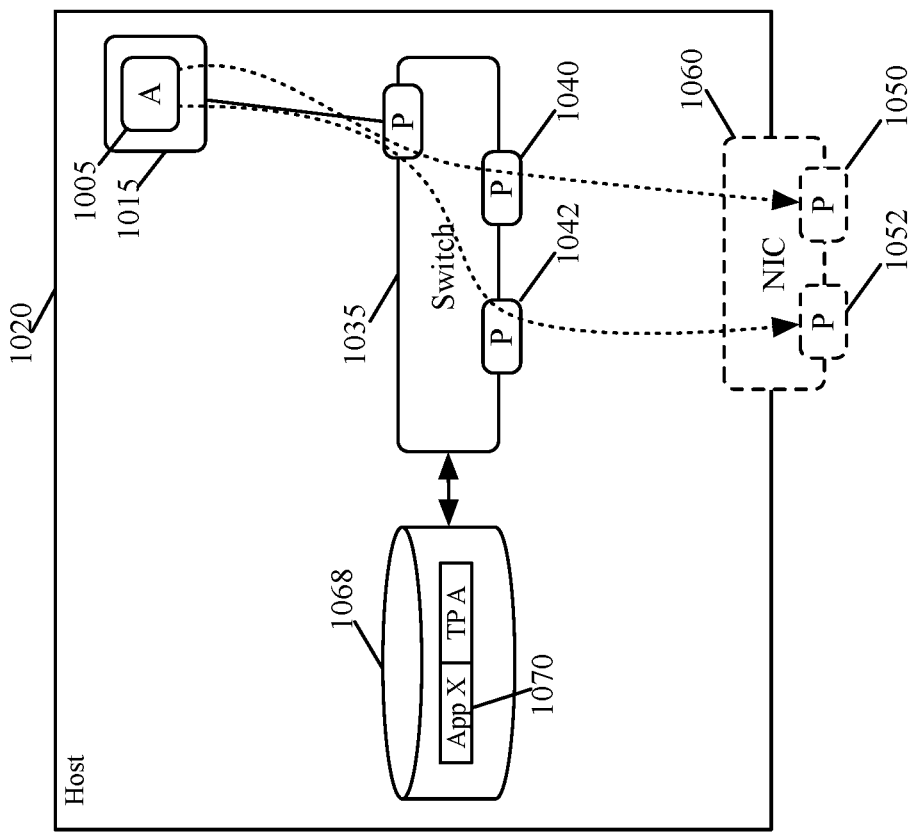
Figure 10:
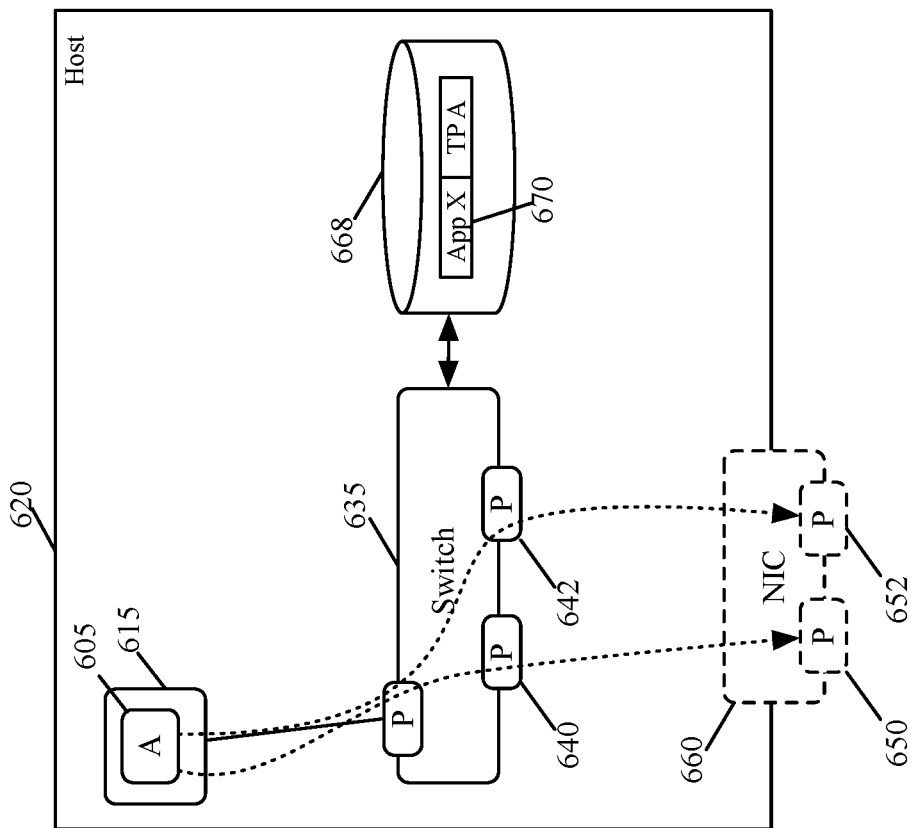

FIG. 10 illustrates one teaming policy rule causing two different software switches executing on two different host computers to similarly distribute data message flows from two different instances of the same application executing on two different machines on the two host computers among a set of interfaces that the local controllers associated with the teaming policy rule on these computers. Specifically, this figure illustrates the teaming policy rule 670 causing the software switch 635 to distribute different data message flows from the first application instance 605 that execute on the machines 615 on the host computer 620 in a load balanced manner between the virtual interfaces 640 and 642 (which will go to the PNIC ports 650 and 652) that the local controller on this computer associated with the teaming policy rule. This figure illustrates the teaming policy rule 1070 in rule storage 1068 causing the software switch 1035 to distribute different data message flows from the second application instance 1005 that execute on the machines 1015 on the host computer 1020 in a load balanced manner between the virtual interfaces 1040 and 1042 (which will go to the ports 1050 and 1052 of PNIC 1060) that the local controller on this computer associated with the teaming policy rule.

In the datapath of a first application executing on a machine operating on a host computer and associated with a first set of interfaces of the host computer, the method of some embodiments identifies a first data message flow sent by the machine. The method then determines that the first data message flow is from the first application executing on the machine. The method next uses an identifier associated with the first application to identify a first set of interfaces of the host computer through which the first data message flow should be sent. The method then forwards the first data message flow out of the host computer through the identified first set of interfaces.

For a second data message flow sent by the machine executing on the host computer, the method of some embodiments determines that the second data message flow is from a second application executing on the machine, and then uses an identifier associated with the second application to identify a second set of interfaces of the host computer through which the first data message flow should be sent. The method then forwards the second data message flow out of the host computer through the second set of interfaces. At least one of the identified sets of interfaces (for the first or second application) has two or more interfaces in some embodiments. Also, the first and second sets of interfaces identified for the first and second application can be different sets of interfaces when the user associates the two applications with two different sets of interfaces of the host computer.

Also, as mentioned above, each set of interfaces in some embodiments includes one or more virtual interfaces of a software forwarding element executing on the host computer, with each virtual interface being associated with a physical port of a NIC of the host computer. Alternatively, each set of interfaces identified for an application in some embodiments includes a set of physical ports of the NIC.

Figure 11:
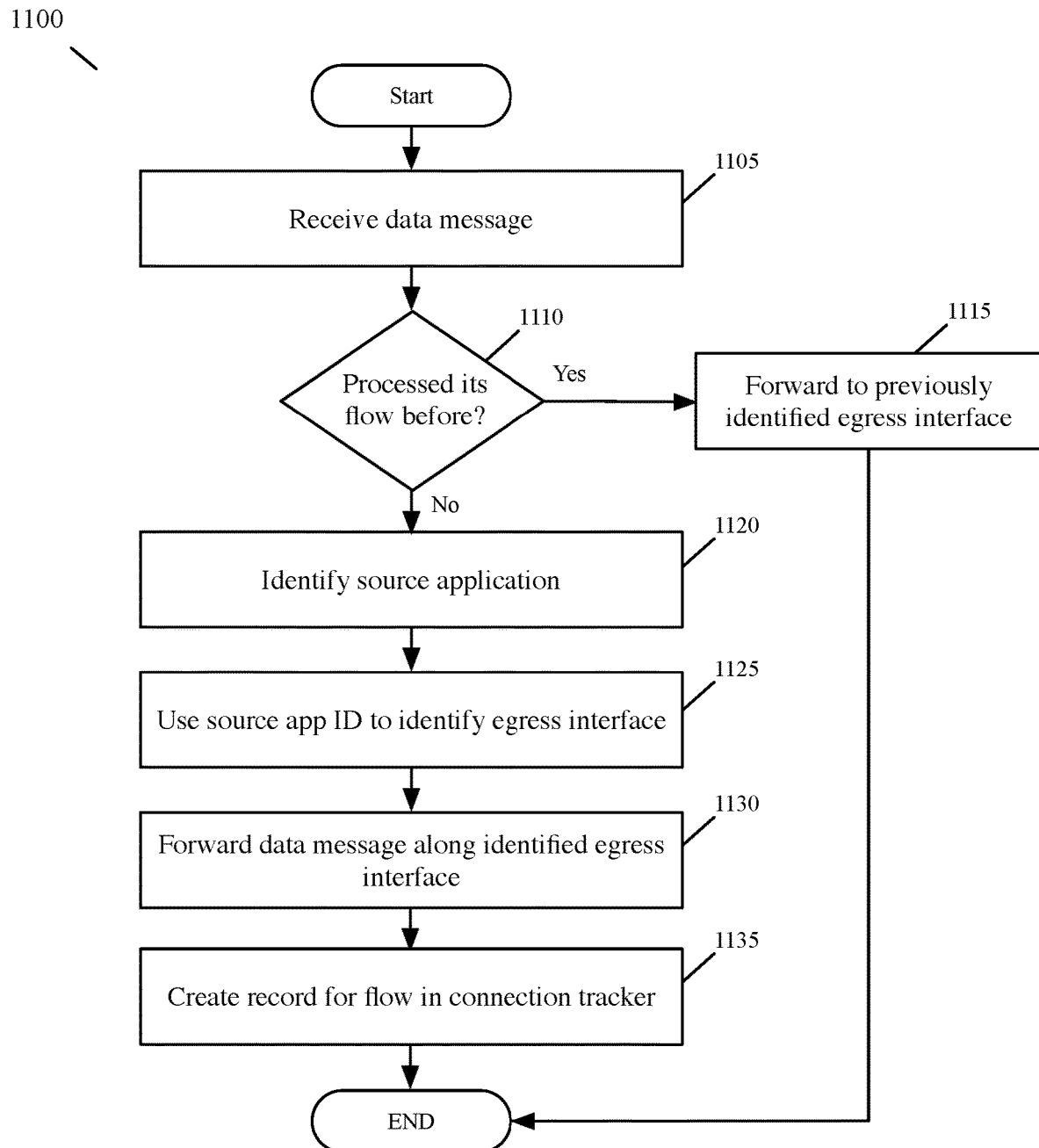
FIG. 11 illustrates a process that performs the datapath method of some embodiments.
Figure 12:
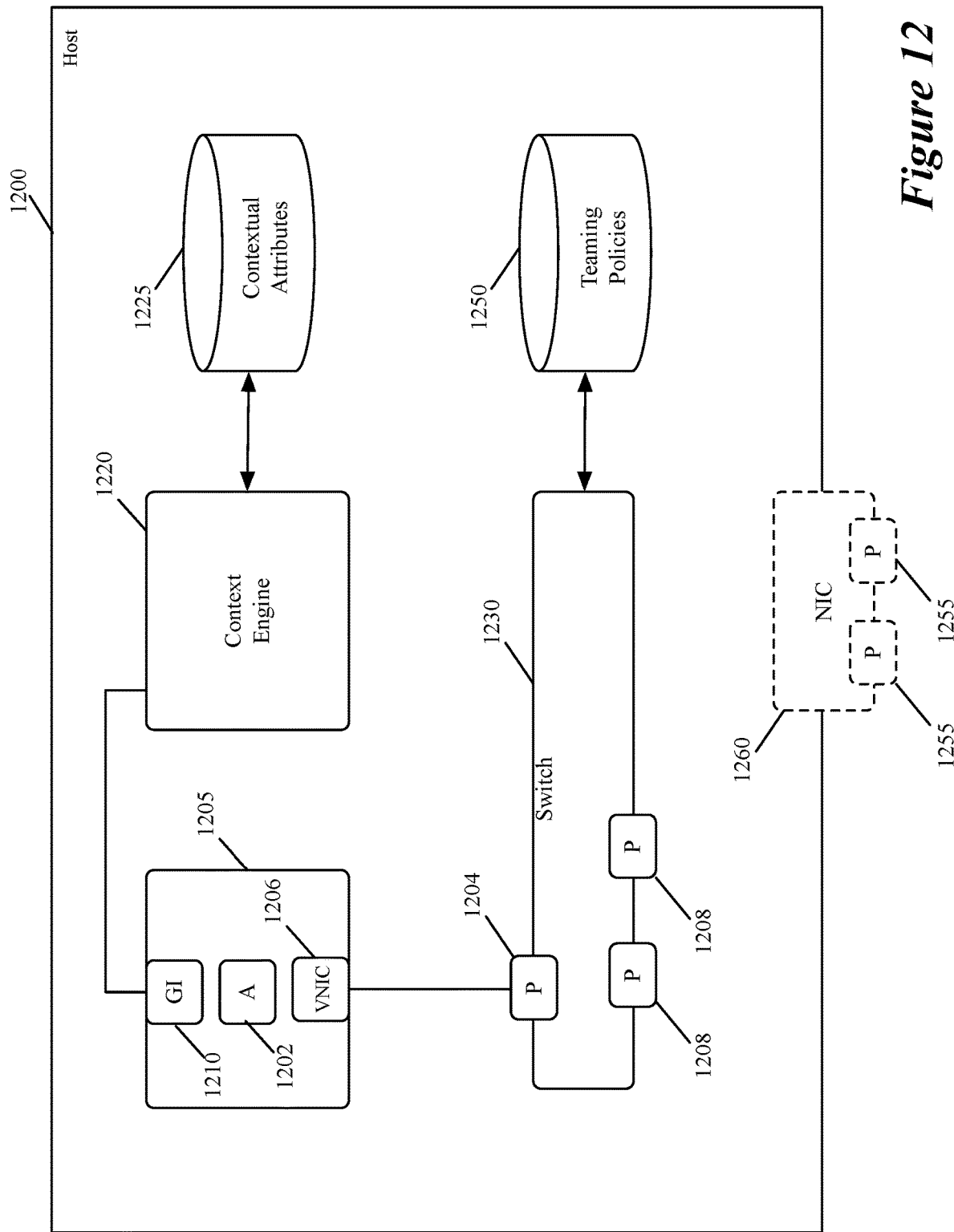
FIG. 12 illustrates one manner through which some embodiments identify the source application associated with a data message flow in the flow's datapath.

FIG. 11 illustrates a process 1100 that performs the datapath method of some embodiments. This process will be described by reference to FIG. 12, which illustrates one manner through which some embodiments identify the source application associated with a data message flow in the flow's datapath. Specifically, FIG. 12 illustrates an application 1202 that executes on a VM 1205 that operates on a host computer 1200.

A guest introspection agent 1210 executes on the VM 1205. Each time the VM starts sending a new data message flow, the GI agent 1210 exports to a context engine 1220 a record that associates the flow's identifier (e.g., five tuple identifier, which is the flow's source and destination IP addresses, source and destination port addresses and protocol) with an identifier that identifies the application that is the source of the flow. The context engine 1220 stores the records supplied by the GI agent in its contextual data store 1225. The operation of this GI agent is described in U.S. Pat. No. 10,802,857, which is incorporated herein by reference. The context engine 1220 stores this record to subsequently provide the source application's identifier to a software switch 1230 executing on the host computer.

The process 1100 in some embodiments is performed by the software switch 1230, while in other embodiments it is performed by another module that the switch 1230 calls. As shown in FIG. 11, the process 1100 starts (at 1105) when the software switch 1230 receives a data message at one of its ports 1204 that is associated with the VNIC 1206 of the VM 1205. The process 1100 then determines (at 1110) whether it has previously analyzed another data message in the same flow as the data message received at 1105. If so, the process (at 1115) selects the egress interface 1208 that it previously selected for this flow, passes the received data message to this egress interface, and then the process ends.

In some embodiments, the process 1100 determines (at 1110) whether it has previously seen the message's flow by determining whether a connection tracking storage that it maintains has the received message's flow identifier (e.g., its five-tuple identifier). As further described below, the process 1100 stores records in the connection tracking storage each time it processes the first data message of a flow.

When the process determines (at 1110) that it has not previously processed any data messages in the same flow as the data message received at 1105, the process 1100 obtains (at 1120) the identifier of the source application for the received data message's flow from the context engine. As shown in FIG. 12, the software switch (or another egress path module) obtains the application identifier from the context engine 1220 by providing the message's flow identifier (e.g., its five-tuple identifier) to the context engine. This engine matches the supplied flow identifier with the flow identifier of one of the records that it stores in its contextual attribute data store 1225, and then provides to the software switch the application identifier that is specified by the matching record.

The process 1100 then uses (at 1125) an application identifier to identify a teaming policy in the teaming policy data store 1250, and then uses the identified teaming policy to identify the switch egress virtual interface 1208 along which the data message should be sent. This egress interface is the virtual interface 1208 that is associated by an administrator specified teaming policy with the identified source application of the data message's flow in some embodiments, while it is the virtual interface associated with the physical port 1255 (of the computer's PNIC 1260) that is associated by the specified teaming policy with the identified source application in other embodiments.

At 1130, the process then passes the data message to the egress virtual interface identified at 1125 for forwarding out of the host computer through the paired PNIC physical port.

Next, at 1135, the process 1100 creates a record in its connection tracking storage that associates the received data message's flow identifier (e.g., its five-tuple identifier) with the egress virtual interface identified at 1125. As mentioned above, the connection tracking storage is checked in subsequent iterations of the process 1100 to process subsequent data messages in order to determine whether the process has previously processed a received message's flow. After 1135, the process ends.

One of ordinary skill will realize that other embodiments perform the datapath operations differently. For instance, instead of using a context engine 1220, other embodiments embed the source application identifier in the encapsulating headers of the data messages. In these embodiments, an egress-path module identifies the application associated with the data message flow by extracting an identifier identifying the application from a header of the data message flow. Also, as mentioned above, the software switch 1230 does not perform the process 1100 in some embodiments, but rather calls another module (e.g., through a hook specified in its ingress ports 1204) to perform all or part of the process 1100 for a received data message.

Figure 13:
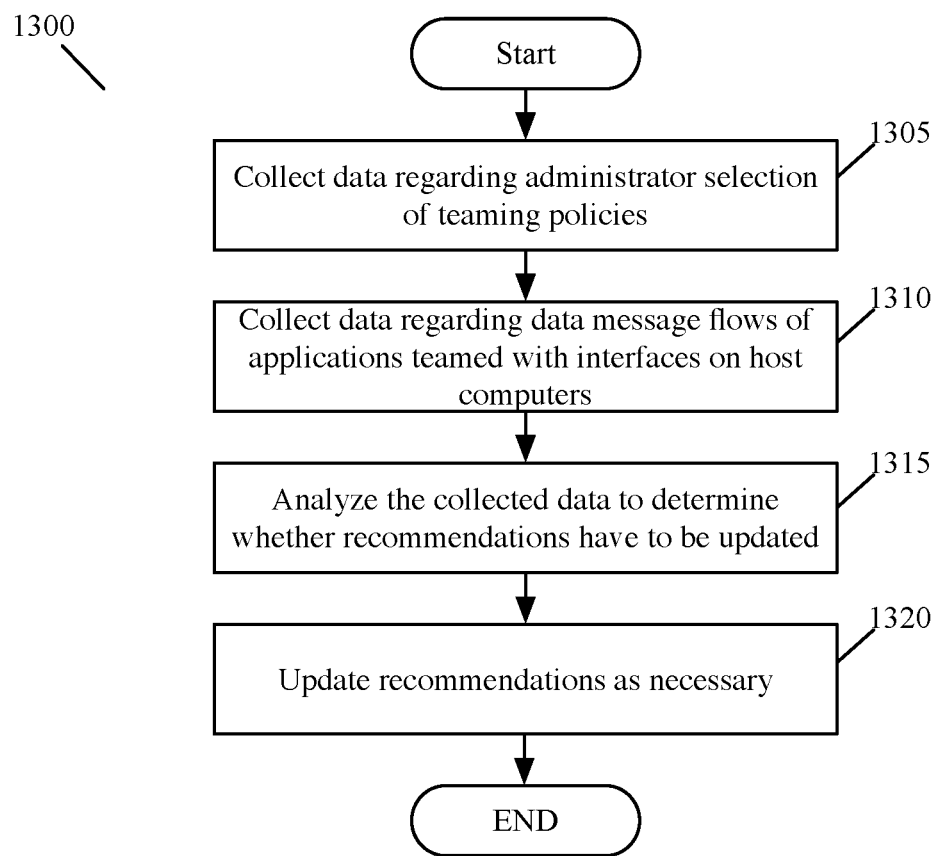
FIG. 13 illustrates a process that the team-policy recommendation engine of FIG. 2 performs in some embodiments.

FIG. 13 illustrates a process 1300 that the team-policy recommendation engine 230 of FIG. 2 performs in some embodiments. In some embodiments, the recommendation engine periodically performs this process (e.g., once an hour, one a day, etc.) to assess whether it needs to modify its teaming-policy recommendations, and if so, to modify them. In other embodiments, the recommendation engine performs all or part of the process 1300 each time it receives data regarding administrator selection of teaming policies and/or data regarding data message flows of applications teamed with interfaces on host computers.

As shown, the process 1300 collects (at 1305) data regarding administrator selection of teaming policies in a particular period. As mentioned above, administrators are provided various candidate teaming policies for applications that are detected to run on the machines managed by the administrators. For any one application, an administrator can select one of the candidate teaming policies presented for the application, or can specify other teaming policies not specified as candidate teaming policies by the recommendation engine 230. Each time an administrator selects or specifies a teaming policy that binds an application's data message flow to a subset of interfaces on one or more host computers, the recommendation engine 230 has an additional datum regarding administrator preferences, and can use this additional datum to fine tune its recommendations, e.g., through machine learning or other learning techniques.

Next, at 1310, the process collects data regarding data message flows of applications teamed with interfaces on host computers. As further described below, host computers collect statistics regarding data message flows of applications that are teamed with interfaces of the host computers. Different statistics are collected in different embodiments. Examples of such statistics include number of flows, number of packets, size of payloads, number of connections per second, etc. Accordingly, in different embodiments, the process 1300 collects any combination of one or more such statistics periodically from the host computers that execute applications with associated teaming policies. The collected statistics will inform the recommendation engine of the performance of the teaming policies selected by the administrators and deployed in the datapath.

At 1315, the process analyzes the data collected at 1305 and 1310 to determine whether it should update any of the recommended candidate teaming policies that it stores in the recommendation data store 209. For instance, by analyzing the collected data, the recommendation engine 230 might determine that a particular application should never use a failover teaming policy as its data message load requires a load balancing teaming policy.

The analysis at 1315 in some embodiments entails identifying poorly performing recommended teaming policies (i.e., identifying teaming policies for which the collected data or metadata produced from the collected data fails to meet threshold performance metrics defined for source applications associated with the teaming policies), and/or identifying optimally performing recommended teaming policies (i.e., identifying teaming policies for which the collected data or metadata produced from the collected data meets threshold performance metrics defined for source applications associated with the teaming policies), assessing whether administrator specified teaming policies performed poorly or optimally, etc. Conjunctively, or alternatively, the analysis at 1315 involves feeding the collected data through a machined-trained network of processing nodes (e.g., neural network) to assess whether candidate teaming recommendations should be dropped from, or new recommendations should be added to the recommendation data store 209.

At 1320, the process 1300 updates one or more teaming policy recommendations in the recommendation data store 209 when the analysis at 1315 indicates that these recommendations need to be updated (e.g., adds one or more new candidate teaming policies for an application or removes one or more candidate teaming policies previously specified for the application). In some embodiments, the process 1300 uses different machined trained networks for different types of companies, with each type of company associated with a set of attributes (e.g., office locations, business sector, size of company, etc.). In these embodiments, to provide recommendations for one company, the process 1300 first identifies a type for the company and then uses that company type's machine learning engine to produce recommended teaming policies for the company and to continuously train the machine learning engine with additional data collected at 1305 and 1310. After 1320, the process ends.

Figure 14:
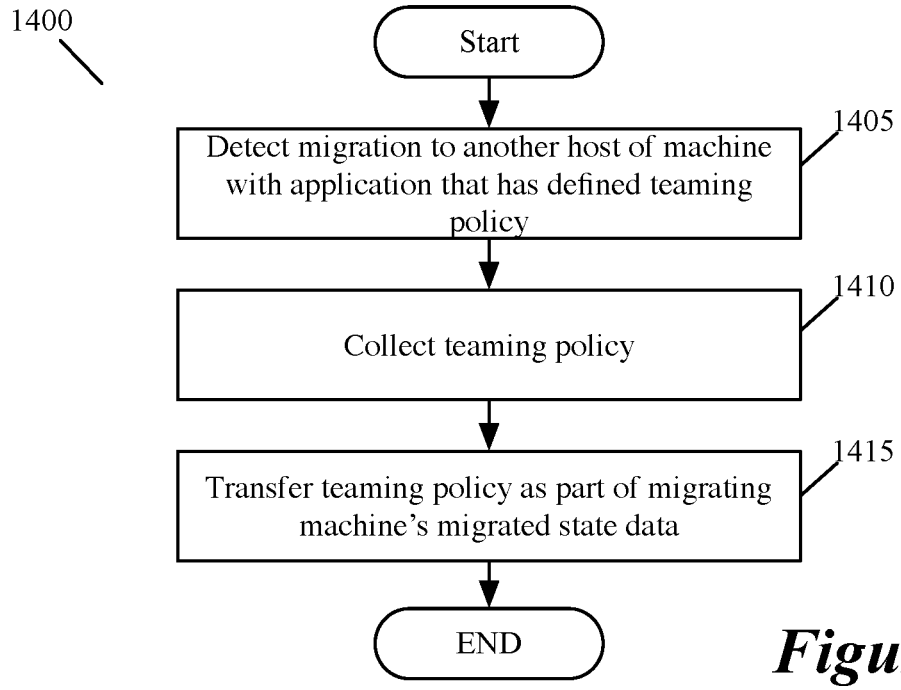
FIG. 14 illustrates a process performed by a VM migration tool that transfers a teaming policy from one host to another.

In some embodiments, the set of teaming policies associated with applications operating on a machine (e.g., a VM) executing on a first host computer are part of the state of that machine that are transferred to a second host computer when the machine migrates to the second host computer. FIG. 14 illustrates a process 1400 performed by a VM migration tool (e.g., the vMotion migration tool of VMware, Inc.) when migrating a VM from one host to another. As shown, the process initially determines (at 1405) that the migrating VM has one or more teaming policies defined for one or more applications executing on the VM. Next, the process collects (at 1410) these teaming policies, and then transfers (at 1415) these teaming policies to the new host computer as part of the migrated state of the migrated VM. After 1415, the process ends.

Figure 15:
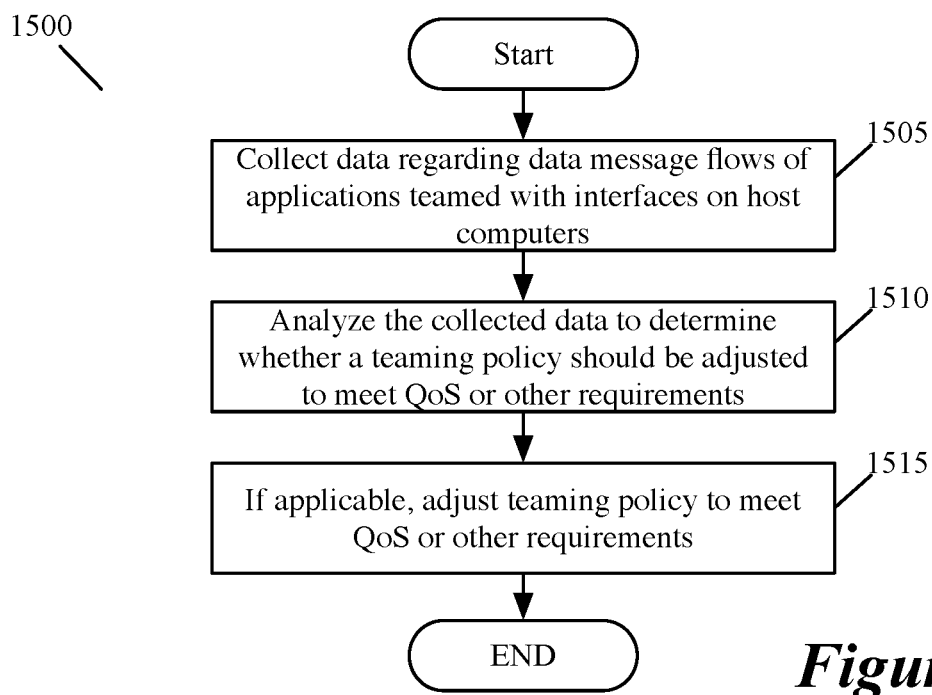
FIG. 15 illustrates an automated process that is performed by the central controller cluster in some embodiments to dynamically adjust an interface teaming policy associated with an application executing on a host computer.

Some embodiments dynamically adjust teaming policies in an automated manner, or provide dynamic recommendations regarding adjusting such policies, based on analysis of operational data collected on host computers. FIG. 15 illustrates an automated process that is performed by the central controller cluster 210 in some embodiments to dynamically adjust an interface teaming policy associated with an application executing on a host computer. The central controller cluster 210 periodically performs this process in some embodiments, while in other embodiments it performs this process on demand, each time it receives a new set of quality of service (QoS) data from a local controller on a host computer.

Figure 16:
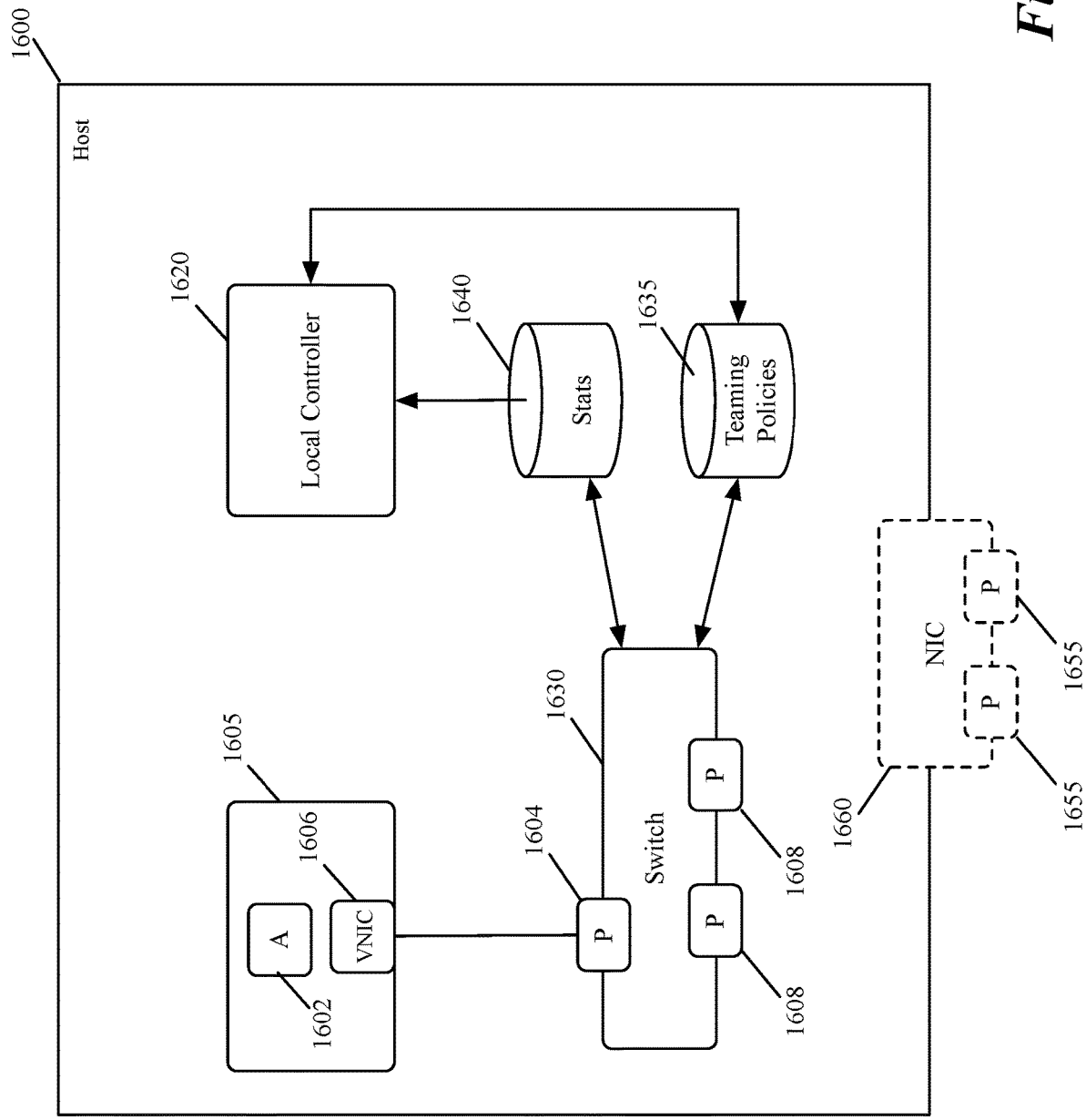
FIG. 16 illustrates an example of a local controller executing on a host computer.

As shown, the process 1500 initially collects (at 1505) data (e.g., statistics) from a local controller of a host computer regarding data message flows from a source application executing on the computer and passing through a set of the computer's interfaces that has been teamed with the source application through a teaming policy. FIG. 16 illustrates an example of a local controller 1612 executing on a host computer 1600. This controller analyzes statistics (e.g., QoS statistics, or metric data, such as connections per second, number of packets, size of the payload of the processed flows, etc.) that the switch 1630 or another module on the host computer stores in a stats storage 1640 for the data message flows that are from a source application 1602 and that pass through a set of the computer's interfaces 1608 or 1655 that has been teamed with the source application through a teaming policy.

As shown, the source application executes on a VM 1605 in this example. Data messages from this source application 1602 pass through the VM's VNIC 1606 to the ingress interface 1604 of the software switch 1630. Based on a teaming policy stored in the teaming policy data store 1635, the switch 1630 passes the data messages from the source application to a set of one or more interfaces that have been associated with (i.e., have been teamed) with the application. These interface set in some embodiments are the egress virtual interfaces 1608 of the software switch, while in other embodiments they are the ports 1655 of the PNIC 1660. When these interfaces are the ports 1655, the switch 1630 passes the data messages from the source application to the set of interfaces 1608 that are associated with the set of ports 1655 that have been teamed with the source application.

In some embodiments, the local controller 1620 passes the statistics from the stats storage 1640 that it retrieves and analyzes to the central controller cluster 210 when the statistics meet a threshold level of a notification rule. This rule specifies that the central controller cluster has to receive the collected statistic or analysis of the collected statistics when the statistics or metadata produced from analysis of the collected statistics meets the threshold level.

For instance, the collected statistic in some embodiments identifies an average depth of a queue in which the data messages are stored before passing through the teamed interface, or an average time delay before data messages are sent through the team interface. When the teamed interface is a PNIC port, the statistics are pushed to the stats storage 1640 by the PNIC or pulled from the PNIC for storing in the stats storage 1640 by a module executing on the host computer. Alternatively or conjunctively, the collected statistic in some embodiments includes size and frequency metrics (e.g., number of packets, number of flow, number of connections per seconds, etc.) regarding the data message flows from the source application through the teamed interface set. In these embodiments, the threshold can be partially based on one or more such metric values.

At 1510, the central controller cluster 210 analyzes the collected data to determine whether the teaming policy for the source application should be adjusted to meet a desired QoS target, or some other requirement or rule that has been specified for the application. For instance, a network administrator might set a rule that the data message flows of the source application cannot experience an average delay, queue length, or volume of flow (e.g., number of flows, packets, etc.) that is larger than a particular threshold value while being teamed with one active interface in a failover policy. This rule can specify that when this particular threshold value is passed the source application should be teamed with two or more interfaces through a load balancing teaming policy.

In some embodiments, the threshold values used by the local controller 1620 and the central cluster 210 are different threshold values, while in other embodiments they are the same threshold value, but the central controller only changes the teaming policy for an application if the threshold is crossed for a certain duration, or for a certain number of instances in a particular duration. For instance, in the above mentioned example, the central controller cluster 210 in some embodiments only changes the source application from a failover teaming policy to a load balancing teaming policy if the collected statistics show that the source application's flows exceed a specified threshold value for N minutes (e.g., 5 minutes) or M times (e.g., 20 times) in N minutes.

At 1515, the process 1500 adjusts the teaming policy for the source application when its analysis (at 1510) of the data collected at 1505 results in a determination that the source application's teaming policy should be adjusted. For instance, in the above-mentioned example, the process 1500 would define a new load balancing teaming policy for the source application based on its analysis, and then provide this teaming policy to the local controller of the host computer on which the source application executes.

In some embodiments, the process would provide this new teaming policy to all host computers that execute different instances of the same source application. In other embodiments, the central controller cluster 210 would not define the new teaming policy, but would adjust its recommendation in its recommendation data store for the source application and/or generate an electronic notification (e.g., email, text message, notification on a UI status window, etc.) to an administrator that would indicate that such a change should be made (e.g., that the source application's teaming policy should change from its current failover policy to a load balancing teaming policy). After 1515, the process ends.

Figure 17:
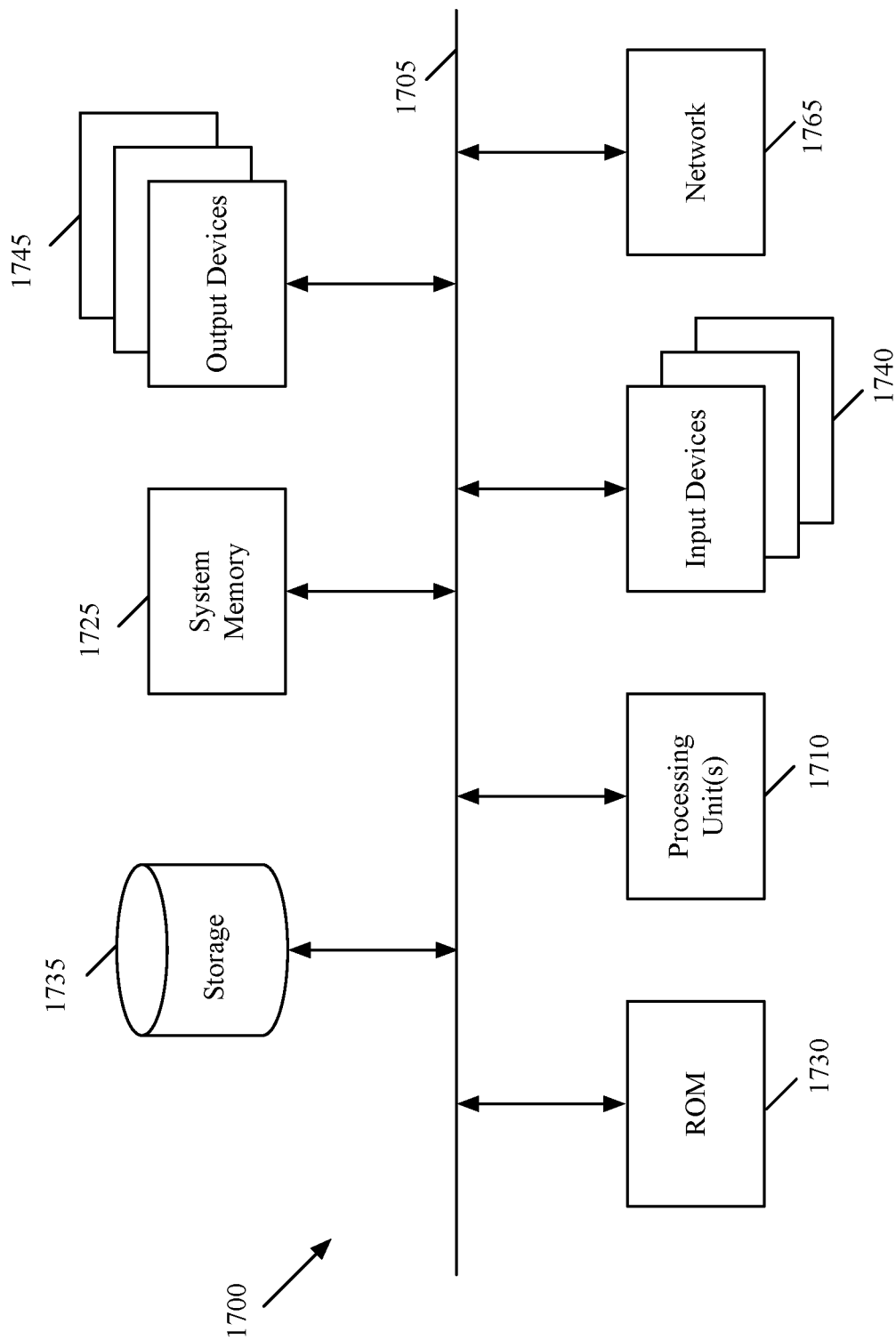
FIG. 17 conceptually illustrates a computer system with which some embodiments of the invention are implemented.

FIG. 17 conceptually illustrates a computer system 1700 with which some embodiments of the invention are implemented. The computer system 1700 can be used to implement any of the above-described hosts, controllers, and managers. As such, it can be used to execute any of the above described processes. This computer system 1700 includes various types of non-transitory machine-readable media and interfaces for various other types of machine readable media. Computer system 1700 includes a bus 1705, processing unit(s) 1710, a system memory 1725, a read-only memory 1730, a permanent storage device 1735, input devices 1740, and output devices 1745.

The bus 1705 collectively represents all system, peripheral, and chipset buses that communicatively connect the numerous internal devices of the computer system 1700. For instance, the bus 1705 communicatively connects the processing unit(s) 1710 with the read-only memory 1730, the system memory 1725, and the permanent storage device 1735.

From these various memory units, the processing unit(s) 1710 retrieve instructions to execute and data to process in order to execute the processes of the invention. The processing unit(s) may be a single processor or a multi-core processor in different embodiments. The read-only-memory (ROM) 1730 stores static data and instructions that are needed by the processing unit(s) 1710 and other modules of the computer system 1700. The permanent storage device

1735, on the other hand, is a read-and-write memory device. This device 1735 is a non-volatile memory unit that stores instructions and data even when the computer system 1700 is off. Some embodiments of the invention use a mass-storage device (such as a magnetic or optical disk and its corresponding disk drive) as the permanent storage device 1735.

Other embodiments use a removable storage device (such as a floppy disk, flash drive, etc.) as the permanent storage device 1735. Like the permanent storage device 1735, the system memory 1725 is a read-and-write memory device. However, unlike storage device 1735, the system memory 1725 is a volatile read-and-write memory, such as random access memory. The system memory 1725 stores some of the instructions and data that the processor needs at runtime. In some embodiments, the invention's processes are stored in the system memory 1725, the permanent storage device 1735, and/or the read-only memory 1730. From these various memory units, the processing unit(s) 1710 retrieve instructions to execute and data to process in order to execute the processes of some embodiments.

The bus 1705 also connects to the input and output devices 1740 and 1745. The input devices 1740 enable the user to communicate information and select requests to the computer system 1700. The input devices 1740 include alphanumeric keyboards and pointing devices (also called "cursor control devices"). The output devices 1745 display images generated by the computer system 1700. The output devices 1745 include printers and display devices, such as cathode ray tubes (CRT) or liquid crystal displays (LCD). Some embodiments include devices such as touchscreens that function as both input and output devices 1740 and 1745.

Finally, as shown in FIG. 17, bus 1705 also couples computer system 1700 to a network 1765 through a network adapter (not shown). In this manner, the computer 1700 can be a part of a network of computers (such as a local area network ("LAN"), a wide area network ("WAN"), or an Intranet), or a network of networks (such as the Internet). Any or all components of computer system 1700 may be used in conjunction with the invention.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Some embodiments include electronic components, such as microprocessors, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A method of associating data message flows from applications executing on a first host computer comprising a set of two or more network interfaces, the method comprising:
   identifying a set of applications operating on a first machine executing on the first host computer, wherein a first instance of a particular application executes on the first machine and a second instance of the particular application executes on a second machine executing on a second host computer;
   identifying candidate teaming policies for associating each identified application with a subset of the interfaces;

generating a report for display to identify candidate teaming policies per application to a user;

in response to user input selecting a particular teaming policy for the particular application, generating a rule and distributing the rule to the first host computer to associate the particular application with a first subset of the network interfaces specified by the particular teaming policy, said rule causing data message flows from the particular application to be directed to the first subset of the network interfaces; and distributing the rule to the second host computer to associate the second application instance with a second subset of the network interfaces specified by the particular teaming policy on the second host computer, said rule causing data message flows from the second application instance to be directed to the second subset of the network interfaces.

2. The method of claim 1, wherein the first subset of network interfaces comprises a set of virtual interfaces of a software forwarding element executing on the first host computer.

3. The method of claim 2, wherein each virtual interface in the set of virtual interfaces is associated with a physical port of a set of network interface cards (NICs) of the first host computer, said virtual interfaces associated with the physical ports through a set of teaming policies.

4. The method of claim 1, wherein the set of network interfaces is a set of physical ports of a set of network interface cards (NICs) of the first host computer.

5. The method of claim 1, wherein the particular application is a first application and the rule is a first rule, the method further comprising, in response to user input selecting a second teaming policy for a second application executing on the first machine, generating a second rule and distributing the second rule to the first host computer to associate the second application with a third subset of the network interfaces specified by the second teaming policy, said second rule causing data message flows from the second application to be directed to the third subset of the network interfaces.

6. The method of claim 1, wherein generating and distributing the rule to the first host computer comprises providing the user input to a set of one or more controllers that generate the rule and distribute the rule to the first host computer.

7. The method of claim 6, wherein:

the set of controllers comprises at least one central controller operating outside of the first host computer and one local controller operating on the first host computer;

the central controller generates and distributes the rule to the local controller; and the local controller modifies the rule for operation on the first host computer.

8. The method of claim 1, wherein the candidate teaming policies include a load balancing policy that spreads data message flow across two or more interfaces and a failover policy that comprises one active interface and one standby interface.

9. The method of claim 1, wherein a software forwarding element executes on the first host computer and uses the rule to direct the data message flows to the first subset of network interfaces.

10. The method of claim 1, wherein identifying the set of applications operating on the first machine comprises identifying the set of applications after the first machine has been deployed on the first host computer and the set of applications have been installed on the first machine.

11. The method of claim 1, wherein identifying candidate teaming policies comprises using identities of each application in the set of applications to retrieve a set of candidate teaming policies for the application from a data storage.

12. A non-transitory computer readable medium storing a program for associating data message flows from applications executing on a first host computer comprising a set of two or more network interfaces, the program executable by a processing unit, the program comprising sets of instructions for:

identifying a set of applications operating on a first machine executing on the first host computer, wherein a first instance of a particular application executes on the first machine and a second instance of the particular application executes on a second machine executing on a second host computer;

identifying candidate teaming policies for associating each identified application with a subset of the interfaces;

generating a report for display to identify candidate teaming policies per application to a user;

in response to user input selecting a particular teaming policy for the particular application, generating a rule and distributing the rule to the first host computer to associate the particular application with a first subset of the network interfaces specified by the particular teaming policy, said rule causing data message flows from the particular application to be directed to the first subset of the network interfaces; and distributing the rule to the second host computer to associate the second application instance with a second subset of the network interfaces specified by the particular teaming policy on the second host computer, said rule causing data message flows from the second application instance to be directed to the second subset of the network interfaces.

13. The non-transitory computer readable medium of claim 12, wherein the first subset of network interfaces comprises a set of virtual interfaces of a software forwarding element executing on the first host computer.

14. The non-transitory computer readable medium of claim 13, wherein each virtual interface in the of set virtual interfaces is associated with a physical port of a set of network interface cards (NICs) of the first host computer, said virtual interfaces associated with the physical ports through a set of teaming policies.

15. The non-transitory computer readable medium of claim 12, wherein the set of network interfaces is a set of physical ports of a set of network interface cards (NICs) of the first host computer.

16. The non-transitory computer readable medium of claim 12, wherein the particular application is a first application and the rule is a first rule, the program further comprises a set of instructions for:

in response to user input selecting a second teaming policy for a second application executing on the first machine generating a second rule and distributing the second rule, to the first host computer to associate the second application with a third subset of the network interfaces specified by the second teaming policy, said second rule causing data message flows from the second application to be directed to the third subset of the network interfaces.

17. The non-transitory computer readable medium of claim 12, wherein the set of instructions for generating and distributing the rule to the first host computer comprises a set of instructions for providing the user input to a set of one or more controllers that generate the rule and distribute the rule to the first host computer.

18. The non-transitory computer readable medium of claim 17, wherein:
- the set of controllers comprises at least one central controller operating outside of the first host computer, and one local controller operating on the first host computer;
- the central controller generates and distributes the rule to the local controller; and
- the local controller modifies the rule for operation on the first host computer.

* * * * *